Jan. 3, 1950     S. R. SMITH, JR     2,493,601
FUSE LINK
Filed Dec. 22, 1944     2 Sheets-Sheet 1
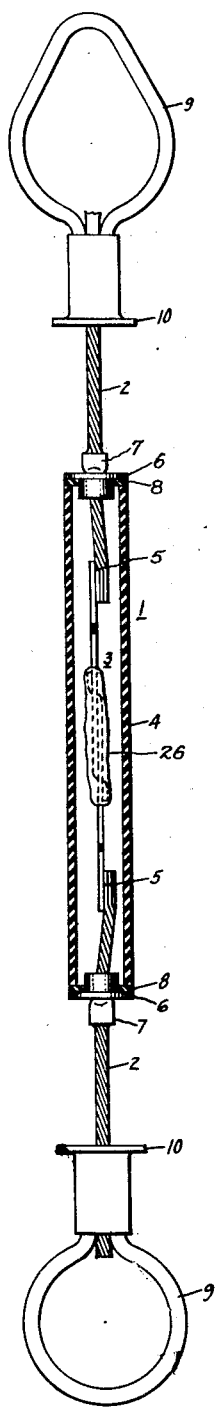
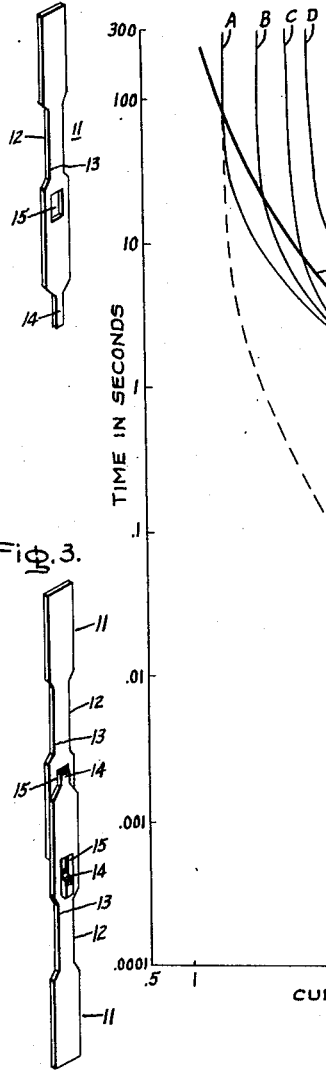
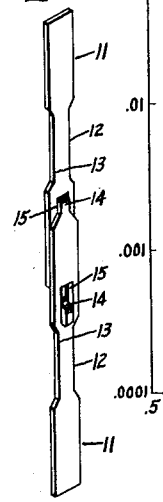
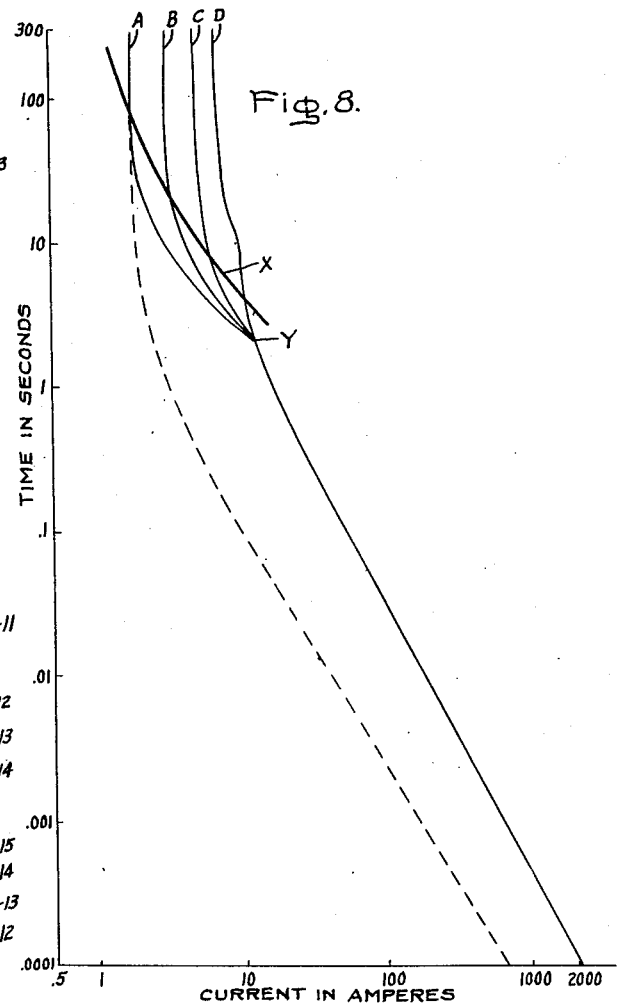
Inventor:
Sidney R. Smith Jr.,
by Harry E. Dunham
His Attorney.

Jan. 3, 1950  S. R. SMITH, JR  2,493,601
FUSE LINK
Filed Dec. 22, 1944  2 Sheets-Sheet 2
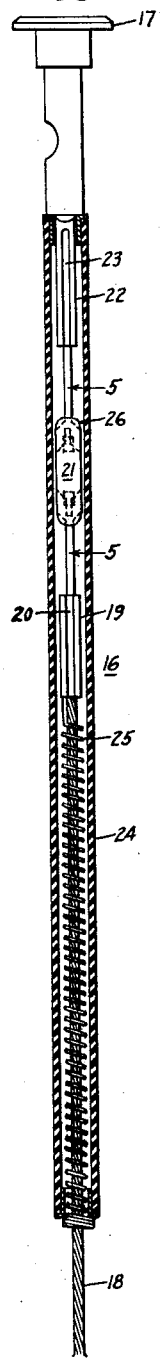
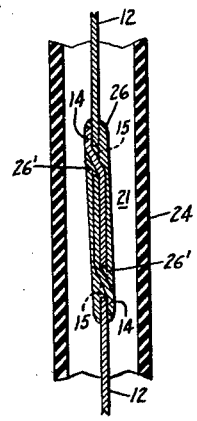
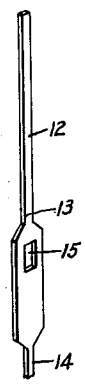
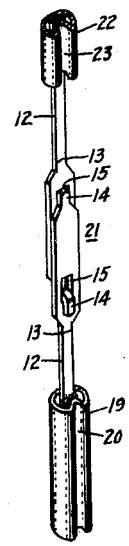
Inventor:
Sidney R. Smith Jr.
by Harry E. Dunham
His Attorney.

Patented Jan. 3, 1950

2,493,601

UNITED STATES PATENT OFFICE 2,493,601

FUSE LINK

Sidney R. Smith, Jr., Pittsfield, Mass., assignor to General Electric Company, a corporation of New York Application December 22, 1944, Serial No. 569,292

5 Claims. (Cl. 200—135)

My invention relates to electric fuse links and more particularly to fuse links which may be used with any type of fuse cutout or fused circuit-interrupting device.

This application is a continuation-in-part of my abandoned application, Serial No. 452,571, filed July 28, 1942, and assigned to the same assignee as the present application.

Electrical distribution circuits are usually provided with various protective means with the ultimate aim of eliminating to as large an extent as possible service interruptions. This is accomplished by sectionalizing the circuit so that, if a fault occurs anywhere thereon, it is possible to isolate a minimum portion while maintaining service on the remainder. Fuse cutouts are used to a large extent for the protection of distribution circuits and it is desirable for proper system coordination that their operation be correlated with relay controlled circuit breakers which are also used for protecting more important sections of the circuit. The fuse link, which is the current sensitive part of a fuse cutout, must be designed to have particular characteristics which afford the best balance between the somewhat conflicting present-day operating requirements of motors, relays, transformers, and fuse cutouts. The time current characteristics of fuse links best suited to the average operating conditions have been calculated and it would be desirable to provide fuse links having these characteristics, which fuse links are simple, compact, and relatively inexpensive as well as dependable in their protective operation. In addition to having time current characteristics which may be properly coordinated with relay controlled circuit breakers, the fuse links should be designed so as to rupture within a very short time on fault currents and yet should not rupture on transients, such as lightning, motor starting currents and the like, to cause undesirable service interruption.

Fuse links which depend upon the melting of a mechanical joint to open the circuit on overload currents have been used because, in such fuse links, the position of the melting curve for overload currents can be shifted by the type of solder used in the mechanical joint. On the other hand, the short-time rating of the fuse link may be determined by the size and material from which the portions soldered or joined together are constructed. The use of low-melting-point solder allows the fuse links to run relatively cool on overload currents even though the members soldered together, hereinafter referred to as the fusible portions, are made from high-melting-point material. Such fuse links usually comprised two members which are overlapped and joined by solder therebetween. Difficulties have been encountered heretofore with fuse links having a lap-soldered joint due to peeling or pulling apart of the lapped joint by virtue of tension applied to the link which is the case in many kinds of fuse cutouts. It would be desirable to provide a new and improved fuse link of this type however because of the cheapness with which they may be manufactured and because they can be constructed of materials which are relatively plentiful.

With fuse links of the type used heretofore, considerable difficulty due to lightning blowing has been encountered. Operators have even found it necessary to increase the minimum fuse size in order to minimize fuse blowing in lightning storms. However, when this is done the protection afforded transformers or other apparatus having a low kv.-a. rating is sacrificed, especially on higher voltage circuits, resulting in an increased number of transformer burnouts, for example. It would be desirable to have a fuse link which would give protection at low currents and still would not be so likely to be ruptured by the lightning surge currents.

Accordingly, it is an object of my invention to provide a new and improved fuse link of the type referred to above which is relatively inexpensive from a manufacturing standpoint and yet is very dependable in operation.

It is another object of my invention to provide a new and improved method of manufacturing fuse links which may be employed in conventional fuse cutouts and the like.

It is another object of my invention to provide a fuse link construction which, with respect to a series of fuse links of different ratings, permits identical time current characteristics at the high current end and dissimilar time current characteristics at the low current end.

A further object of my invention is to provide a new and improved fuse link having overlapping parts of relatively large area soldered together and a narrow fusible portion with a variable length to control the heating and consequently the separation of the overlapping parts.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawings in which Fig. 1 is a sectional view of one type of fuse link embodying my invention, Fig. 2 is a perspective view of one of the members used in the construction of the fuse link of Fig. 1, Fig. 3 is a perspective view of the fusible portion of the fuse link of Fig. 1 before the overlapping parts have been soldered together, Fig. 4 is a sectional view of another type of fuse link embodying a modification of my invention, Fig. 5 is an enlarged sectional view taken on line 5—5 of Fig. 4, Fig. 6 is a perspective view of one of the members used in the construction of the fuse link of Fig. 4, Fig. 7 is a perspective view of the fusible portion of the fuse link of Fig. 4 before the overlapping parts have been soldered together, and Fig. 8 illustrates curves which aid in understanding my invention.

Although my invention is particularly concerned with fusible elements for any kind of fuse link, I have chosen to illustrate my invention in Fig. 1 as applied to a fuse link which is adapted for use in connection with the so-called "tubeless type" of cutout such as is disclosed and claimed in United States Patent No. 2,348,029, granted May 2, 1944, and assigned to the same assignee as the present application. In Fig. 4, I have illustrated my invention as applied to the so-called "universal cable type" of fuse link which may be used with many different types of fuse cutouts whether of the enclosed type, the open type, the drop-out type, or the reclosing type. Examples of these cutouts are well known and are represented by the following patents: 2,031,813, 1,973,265, 2,197,646, and 2,164,994, respectively, all assigned to the same assignee as the present application.

Referring now to Fig. 1, I have illustrated my invention as applied to a fuse link generally indicated at 1 comprising a pair of flexible cables 2 spaced apart at their inner ends which are interconnected by a fusible element generally indicated at 3, the latter being enclosed in a tubular member 4. Preferably, tubular member 4 is formed of horn fibre or other material that is characterized by the ability to give off a gas when subjected to the heat of an electric arc, which gas tends to extinguish said electric arc. The ends of the spaced-apart cables 2 are preferably welded as is indicated at 5 to the respective ends of the fusible element 3 to be described in greater detail hereinafter.

In order suitably to support tubular member 4 in position around fusible element 3, preferably a one-piece metal collar 6 is provided for each end of tubular member 4 to close the ends thereof and includes a portion 7 which may be swaged or crimped to engage firmly cable 2. Preferably a suitable gasket or washer 8 will be provided between tubular member 4 and collar 6 for sealing purposes. At the outer ends of the cables 2 of fuse link 1 are provided fuse link terminals comprising loops 9 and stop members 10. The loops 9 are provided so that the fuse link 1 may readily be handled by means of a switch stick and, if desired, the upper loop may have a slightly different shape, as illustrated in Fig. 1, than the lower loop to indicate which is the upper part of the fuse link. Also, this shape may be such as to facilitate handling by the switch stick for insertion into a cutout of the type disclosed in Patent 2,348,029, referred to above.

The particular arrangement of the parts of the fuse link 1 of Fig. 1 forms no part of the present invention which is concerned primarily with the construction of the fusible element 3 thereof. Preferably, the fusible element 3 of Fig. 1 comprises a pair of thin metal members or punchings 11 each including a necked down portion 12 which together with the type of material from which punchings 11 are constructed determines the melting time of the fuse under high current conditions since melting under these conditions occurs in this section. On low overload currents, the melting time of fusible element 3 is determined by the melting of the mechanical joint to be described hereinafter between metal members or punchings 11. Preferably, the overlapping portions of punchings 11 are predipped in solder to the point 13 indicated thereon and the punchings are then overlapped and placed between the electrodes of a suitable welding machine through which a fixed value of current will be made to flow for a definite time to cause the punching ends to sweat together, whereby a fusible element which is very inexpensive to manufacture and requires no hand soldering is produced.

It will be understood by those skilled in the art that a certain amount of tension will always be applied to fuse links of the type illustrated in Fig. 1. In order to prevent the lapped joint of fusible element 3 from having any tendency to peel, that is, when one portion thereof peels or pulls away from the other portion, I provide a suitable mechanical lock. This lock is provided by shaping each of the punchings 11 so as to have a small end or tab 14 adapted to pass through a rectangular aperture 15, preferably punched, in the other part of the fusible element, thus affording a mechanical lock which avoids any peeling action. By making the openings or apertures 15 rectangular in shape, the ends or tabs 14 may move freely, thereby permitting unimpeded movement of the two punchings 11 with respect to each other once the solder has melted. A very slight movement after the solder has melted removes the interlocking of the end tabs 14 with the apertures 15.

Before discussing the operation of the fuse link of Figs. 1, 2 and 3 I will first describe the fuse link illustrated in Figs. 4, 5, 6 and 7 since the operation of the two fuse links is substantially the same. The universal cable type fuse link illustrated in Fig. 4 is in many respects very similar to the fuse link disclosed in United States Patent No. 2,341,865, Hermann, granted February 15, 1944, and assigned to the same assignee as the present application. The fuse link of Figs. 4, 5, 6 and 7 generally indicated at 16, comprises a first or upper buttonhead terminal 17 which is adapted to be clamped into the fuse holder of the type disclosed in any except the first of the above-mentioned patents. Fuse link 16 includes a second or lower terminal which comprises a flexible cable portion 18 adapted to be connected to a contact of a suitable fuse cutout. Cable 18 is connected at its upper end to a tubular member 19 which is slipped over the end of the cable and fastened thereto as by crimping the tubular member 19 as indicated at 20. Electrically interconnecting these first and second fuse link terminals is a fusible element 21 very similar to the fusible element 3 of Fig. 1. The upper terminal 17 terminates in a tubular portion 22 which is adapted to be slipped over the upper end of fusible element 21 and fastened thereto by crimping as indicated at 23. The lower end of fusible element 21 is inserted in the upper end of tubular member 19 and is held firmly thereto by the crimping indicated at 20 which also holds flexible cable 18. Preferably, an insulating housing of tubular form, such as 24, is provided to protect the fusible element 21 in a manner similar to the tubular member 4 of Fig. 1. For low current ratings, it may be desirable to provide mechanical means for insuring high speed separation of the fuse link parts upon rupture of the fusible element 21 and, to this end, I have illustrated a tension spring 25 suitably connected between the lower end of insulating tube 24 and tubular member 19.

The fusible element 21 of fuse link 16, as was mentioned above, is very similar to the fusible element 3 of fuse link 1 and the corresponding parts thereof are designated by the same reference numerals. The overlapping parts have a relatively large area so that when the solder indicated at 26 in the drawings is provided a large soldered area capable of resisting the tensile pull normally applied to the fuse link is provided. The portion of reduced cross section 12 is fairly long in fuse link 16 and the effective length thereof may be varied by cutting off a portion or varying the amount inserted in tubular portion 22 or tubular member 19. The time-current characteristics of the fuse links illustrated in the drawings, for short-time melting currents, are determined by the type of material used and the cross sectional area of the portion 12, since melting of the fuse link in section or portion 12 occurs at high currents. Lower currents, however, produce heat in the section 12 which is conducted to the overlapping soldered section until the soldered section reaches the melting point of the solder used at which time the joint gives way if there is a slight mechanical tension on it. By varying the effective length of section 12 heating of the soldered joint may be varied. For example, if greater heating is desired the effective length of section 12 may be increased and melting at lower currents can be obtained. It is also possible to shift the melting curve for overload currents by using various solders having different melting points. It will be observed then that with my construction any desired time current characteristic may be obtained. For example, by using identical punchings of the same or different materials, and varying the length of sections 12, a series of fuse links may be produced having identical characteristics at high currents but varied characteristics at low currents, as will be brought out in greater detail hereinafter. The amount of tension applied to the fusible element is more or less immaterial so long as there is a slight amount of tension to cause separation of the interlocking parts upon melting of the soldered joint.

From the above description, it will be obvious that I have provided a new and improved fuse link which is relatively inexpensive and which is very dependable in operation. In addition it permits special time-current characteristics better suited to meet the divergent system requirements of minimizing fuse blowing by lightning while providing improved protection to the connected apparatus such as transformers.

With the above construction "peeling" apart of the fuse link parts is substantially prevented from occurring until the melting temperature of the solder 26 is reached. This is because the tabs 14 in passing through the apertures 15 prevent any portion of the soldered joint, and especially the end portions, from being subjected to a concentrated stress such as would cause them to peel apart, that is, to tear apart progressing from the ends of the joint towards the center. In the type of fuse link which I have disclosed the tendency of the soldered portions to peel apart is accentuated by the close proximity of the ends of joint 21 to the main source of heat, the necked sections 12, which cause the ends of the joint 21 to reach the melting temperature of the solder earlier than the center of the joint. In fact I have demonstrated by test that temporary overloads can cause temporary melting of the solder at the ends of joint 21 without melting the center portion and if the ends are not mechanically locked they are subject to separating or peeling apart, which would of course mean deterioration and eventual separation of the entire joint under conditions other than those for which it was designed. Also portions of the solder indicated at 26' in Figure 5 between tabs 14 and the edges of apertures 15 are under compression. My arrangement, therefore, overcomes the difficulty of prior art fuse links employing soldered joints where portions of the soldered joint are subjected to concentrated stresses which cause peeling apart, where no portion of the solder is placed under compression and where small soldered areas were employed.

As stated above the size and material of the necked sections 12 govern the time-current characteristics at the high current end and the melting temperature of the solder used for sweatting together the overlapping sections plus the effective length of the necked sections governs the time-current characteristics of the low current end. By proportioning the necked or reduced sections 12 as to material, length and cross sectional area and proportioning the melting point of the solder used and the area of the soldered overlapping sections, I have produced a line of fuse links which have the low lightning impulse fuse blowing rate of a higher rated fuse link, but which provide the varying low current protective ability for connected apparatus of low current rating fuse links. In general it will be possible to use punchings or members of identical size and material to obtain the time-current characteristics just described and as illustrated in Fig. 8. I do not wish this disclosure or the claims to be so limited since each of the individual fuse links of the line could be made using a punching or member of different size and material but with the correct co-acting solder temperature to produce the desired time-current characteristic.

In Fig. 8 are drawn the time-current characteristics of a line of fuse links as hereinbefore described showing their relationship to the American Standards Association time-load characteristics for distribution transformers which for a particular size of transformer is indicated by the curve X in Fig. 8. The fuse link characteristics are designated as A, B, C and D in Fig. 8 and in practice the current ratings might be 1, 2, 3 and 5 or 2, 3, 5 and 8 or 3, 5, 8 and 10 amperes or a similar combination of higher ratings. It is not intended that the series be limited to four ratings but may be any number from two up. Curve A crosses the transformer time load curve X at lower currents than curves B, C, or D thus indicating better protection to the transformer. Similarly, a fuse link having the characteristic B provides better protection than fuse links having the characteristics C or D, etc. It should be noted that all the curves converge at the point Y in Fig. 8 in the neighborhood of a time of two seconds and for rupturing times of less than two seconds the time-current characteristics for the series of four fuse links are identical. With conventional fuse links of the type illustrated in United States Patents 1,833,849, 1,962,654 and 2,341,865, all assigned to the same assignee as the present application, the time-current characteristics for a fuse having the same rating as the fuse represented by curve A would be like the dotted extension of curve A in Fig. 8. It is obvious from Fig. 8 that lightning currents which exist for only short times measured in micro seconds might cause operation of conventional fuses while they would not cause operation of a fuse of the same rating constructed in accordance with my invention. It will be seen from Fig. 8 that with my invention a line of fuse links may be provided with varying over-current protective abilities at predetermined low currents and with uniform time-current characteristics at predetermined high currents.

Although preferred embodiments of the invention have been disclosed in complete detail so as to insure a complete understanding of the invention, it is contemplated that details of the disclosed structure are capable of modification and that other applications and features of the invention may occur to those skilled in the art. Hence, it is intended in the appended claims to cover all such modifications and changes as fall within the true spirit and scope of my invention.

What I claim as new and desire to secure by Letters Patent of the United States is:

1. A fuse link comprising a pair of end portions and a severable section joining said end portions and comprising a pair of members at least one of which has a reduced section at which heating will develop under low current overload and at which rupture will occur under high current overload, said members being terminally overlapped and being joined at the region of overlap by a fusible metal meltable upon occurrence of sustained low current heating of said reduced section, each of said members having means including an end portion engageable with the opposite surface of the other member to preclude lateral motion thereof except upon prior longitudinal separative motion of the members, whereby premature peeling apart of said members upon temporary low current overload is positively prevented while permitting sliding separation of said parts upon melting of said fusible metal.

2. A fuse link comprising a pair of end portions and a severable section joining said end portions and comprising a pair of members at least one of which has a reduced section at which heating will develop under low current overload and at which rupture will occur under high current overload, said members being terminally overlapped and being joined at the region of overlap by a fusible metal meltable upon occurrence of sustained low current heating of said reduced section, each of said members having an opening therein adjacent the region of overlap and between said region and the end portion of the fuse associated with that particular member, and each having a tongue which extends through the opening of the other member to engage the opposite surface of said other member adjacent the boundary of the opening most remote from said region of overlap, said tongue being thus withdrawable from said opening only upon the occurrence of longitudinal separative motion of said members whereby premature peeling apart of said members at the region of overlap upon temporary low current overload is positively precluded while permitting sliding separation of said parts upon melting of said fusible metal.

3. A fuse link comprising a pair of end portions and a severable section joining said end portions and comprising a pair of members each having a reduced section at which heating will develop under low current overload and at which rupture will occur under high current overload, said members being terminally overlapped at a region at which each is of materially greater cross section than said reduced section and being joined by a fusible metal meltable upon occurrence of sustained low current heating of said reduced sections, each of said members having an opening therein between its reduced section and the region of overlap and each having a tongue which extends through the opening of the other member to engage the opposite surface of said other member adjacent the boundary of the opening most remote from said region of overlap, said tongue being thus withdrawable from said opening only upon the occurrence of longitudinal separative motion of said members whereby premature peeling apart of said members at the region of overlap upon temporary low current overload is positively precluded while permitting sliding separation of said parts upon melting of said fusible metal.

4. A fuse link comprising a severable section including a pair of overlapped members each terminating in a reduced section at which heating will develop under low current overload and at which rupture may occur under high current overload, solder joining said members at the region of overlap and meltable upon occurrence of sustained low current heating of said reduced section, each of said members having means including an end portion engageable with the opposite surface of the other member to preclude lateral motion thereof except upon prior longitudinal motion of the members, whereby premature peeling apart of said members upon temporary low current overload is positively precluded while permitting sliding separation of said parts upon melting of said solder, and conductive end portions respectively engaging the remote extremities of said members, said end portions being formed to be respectively slidable on said reduced sections during assembly so that the length and consequently the heating quality of said sections may be variably predetermined without changing said region of overlap, thereby effectively establishing the low current rupture characteristic of the fuse link at a desired current value.

5. A fuse link comprising a severable section including a pair of members having portions which respectively overlap and at least one of which includes a portion reduced in section relative to the overlapped portion from a point adjacent the overlapped portion to the extremity of said member at which heating will develop under low current overload and at which rupture will occur under high current overload, solder joining said members at the region of overlap and meltable upon occurrence of sustained low current heating of said reduced section, and conductive end portions respectively engaging the remote extremities of said overlapped members, the end portion which engages said reduced section being formed to be slidable thereon during assembly so that the length and consequently the heating quality of said section may be variably predetermined without changing said region of overlap, thereby effectively establishing the low current characteristic of the fuse link at a desired current value.

SIDNEY R. SMITH, Jr.

REFERENCES CITED

The following references are of record in the file of this patent:

UNITED STATES PATENTS

| Number | Name | Date |
|---|---|---|
| 538,739 | Neracher | May 7, 1895 |
| 1,239,878 | Carel | Sept. 11, 1917 |
| 1,248,433 | Lewis | Nov. 27, 1917 |
| 1,267,906 | Rowley | May 28, 1918 |
| 1,283,612 | Adams | Nov. 5, 1918 |
| 1,300,046 | Teague | Apr. 8, 1919 |
| 1,465,477 | Lubbock | Aug. 21, 1923 |
| 1,622,054 | Rowley | Mar. 22, 1927 |
| 1,934,244 | Steinmayer | Nov. 7, 1933 |
| 2,022,795 | Vehko | Dec. 3, 1935 |
| 2,104,899 | Earle | Jan. 11, 1938 |
| 2,281,266 | Carlisle | Apr. 28, 1942 |
| 2,284,291 | May | May 26, 1942 |